Patented Aug. 12, 1947

2,425,348

UNITED STATES PATENT OFFICE 2,425,348

MIXTURE OF CYCLIZED RUBBER AND RESORCINOL-FORMALDEHYDE RESOL

Herman E. Schroeder, Wilmington, Del., assignor to E. I. du Pont de Nemours & Company, Wilmington, Del., a corporation of Delaware No Drawing. Application September 9, 1943, Serial No. 501,657

4 Claims. (Cl. 260—3)

This invention relates to heat-convertible compositions and particularly to compositions comprising heat-convertible aldehyde resols.

In the construction of many articles, the ultimate in strength and resistance to deformation can be secured only through lamination of various elements, by means of an adhesive, thus forming composite structures. This goal of ultimate strength has not heretofore been achieved in many instances because of the unavailability of suitable adhesives. Typical examples are structures composed of natural or synthetic rubber laminated to regenerated cellulose, steel, aluminum, etc.

It has now been found that, by blending cyclized rubber with thermosetting formaldehyde-mononuclear polyhydric phenol resols, there results a composition which can be used very advantageously as an adhesive in the manufacture of composite articles which are to be used at normal and at elevated temperatures.

The aforementioned cyclized rubber is a resinlike material, obtained by the action of acid reagents on rubber at elevated temperatures. Variations in the type of acid reagent and in the time and temperature of reaction results in a family of resins, offered in commerce under the trade names of "Pliolite," "Plioform," "Thermoprene," etc.

It is an object of this invention to provide new class of compositions. It is another object to provide compositions which are flexible and heat-convertible. A further object is to provide compositions which have outstanding adhesive properties at normal and at elevated temperatures. A still further object is to provide adhesive compositions which are heat-convertible and which have outstanding power for bonding natural and synthetic rubbers to other surfaces. A general advance in the art and other objects, which will appear hereinafter, are also contemplated.

The above and other objects are accomplished by blending a cyclized rubber with a heat-convertible formaldehyde-mononuclear polyhydric phenol resol.

For practical reasons, the compositions of this invention are generally made by blending solutions in organic solvents of the cyclized rubber and thermosetting formaldehyde-mononuclear polyhydric phenol resols. In place of using solutions in organic solvents, the cyclized rubber and thermosetting aldehyde resol can be dispersed or emulsified in a water containing medium and the dispersions then blended. If desired, however, the cyclized rubber and thermosetting aldehyde resol can be mixed in the dry state to produce a homogeneous blend.

The examples, which follow, illustrate the principles and diverse embodiments of the invention, including those contemplated for carrying out the same. In the examples, parts are by weight unless otherwise stated.

EXAMPLE I

A cyclized rubber is prepared by masticating 1000 parts of smoked sheet rubber on a mill at 70° C. until it forms a smooth, continuous sheet. To the rubber on the mill is added 500 parts of a carbon black, sold under the trade name of "Micronex," and the mixture worked on the mill until the carbon black is homogeneously dispersed in the rubber. The blend is removed from the mill, cut into small pieces and dissolved in 4500 parts of xylene. To the solution is added 22.5 parts of concentrated sulfuric acid and 200 parts of phenol and the mixture heated with stirring for 16 hours at 115° C. At the end of this period the acid is neutralized by adding, with stirring, 30 parts of ethanolamine. The mixture is then cooled to 25° C.

A resorcinol-formaldehyde resol is prepared by dissolving 24 parts of paraformaldehyde in 162 parts of normal butanol containing 0.24 part of potassium hydroxide and then adding to this solution with stirring at 20° C., 30 parts of resorcinol, followed by 1 part of of a 25% solution of phosphoric acid in ethanol.

Two hundreds parts of the cyclized rubber, prepared as described above, is mixed with stirring with 88 parts of the resorcinol-formaldehyde resol solution prepared as described above. To the blend is added with stirring 16 parts of a 10% solution of hexamethylene-tetramine in chloroform and the resulting composition used as an adhesive in laminating rayon, nylon, and cotton to natural and synthetic rubbers as follows Weighed strips of square woven rayon, nylon and cotton fabrics are coated with the above adhesives, the coated strips are heated for from 5 to 30 minutes at 70 to 80° C., cooled, and then weighed to determine the amount of adhesive deposited on the cloth. The coated strips are then pressed onto carcass stocks of natural rubber, GRS [1] (Buna S [1]), and neoprene [2], calendered onto a cotton fabric backing for reenforcement and compounded for vulcanization. The assemblage of carcass and cyclized rubber/thermosetting aldehyde resol coated fabric is placed in a mold and heated at 140° C. to 145° C. until the rubber is vulcanized and the adhesive has heat converted. Thereafter, the composite is removed from the mold, cooled and bond strength determined by measuring the pull in pounds per linear inch required to separate the rubber from the adhesive coated fabric. The results are summarized in Table I below.

bond strength of 25 lbs. per linear inch at 25° C. but is completely ineffective at 100° C., the bond strength having fallen to 1.2 lbs. per linear inch. At such temperatures, and even up to 140° C. or higher, combinations containing the thermosetting formaldehyde-mononuclear polyhydric phenol resol retain substantially all of their original bonding effectiveness.

TABLE I

Lamination of natural and synthetic rubbers to rayon, cotton and nylon

| Fabric | Adhesive Composition | Rubber Stock | Adhesive Loading, Per Cent | Bond Strength, lbs./in. at— | |
|---|---|---|---|---|---|
| | | | | 25° C. | 100° C. |
| Rayon | None | Rubber | | 2.0 | 1.5 |
| | | GR-S [1] | | 2.0 | 1.7 |
| | | Neoprene [2] | | 2.0 | 1.5 |
| | Cyclized rubber of Ex. 1 | Rubber | 15 | 10.0 | 1.0 |
| | Resorcinol-formaldehyde resol | do | 10 | 4.5 | 4.0 |
| | Adhesive of Ex. 1 | Rubber | 20 | 45 | 38 |
| | | GR-S [1] | 15 | 35 | 30 |
| | | Neoprene [2] | 18 | 31 | 15 |
| Nylon | None | Rubber | | 2.0 | 1.5 |
| | | GR-S [1] | | 2.0 | 2.0 |
| | Adhesive of Ex. 1 | Rubber | 20 | 35 | 26 |
| | | GR-S [1] | 19 | 49 | 32 |
| Cotton | | Rubber | | 18 | |
| | | GR-S [1] | | 17 | |
| | Adhesive of Ex. 1 | Rubber | 15 | 36 | 31 |
| | | GR-S [1] | 15 | 38 | 30 |

[1] A 75/25 butadiene/styrene interpolymer prepared by procedures analogous to those of U. S. Patent 1,938,731.
[2] A 2-chloro-1,3-butadiene (chloroprene) polymer, prepared according to U. S. Patent 2,264,173.

EXAMPLE II

A cyclized rubber is prepared by masticating 100 parts of smoked sheet rubber on a mill at 70° C. until it forms a smooth, continuous sheet. The rubber is removed from the mill, cut into small pieces and dissolved in 900 parts of xylene. To this rubber solution is added a mixture of 2.25 parts of concentrated sulfuric acid and 15 parts of phenol and the mixture heated for 13 hours at 100° to 115° C. with stirring, after which there is added 3 parts of ethanolamine, and the mixture cooled to 25° C.

An adhesive composition, prepared by blending the above cyclized rubber with the resorcinol-formaldehyde resol, described in Example I, was evaluated in the bonding of natural rubber to rayon. The composition of the blend and the bond strengths obtained, in comparison with cyclized rubber alone and with the resol alone, are listed in Table II.

EXAMPLE III

A series of cyclized rubbers is prepared as follows from neoprene and GRS [1]:

A. Fifty parts of GRS [1] is dissolved in 450 parts of xylene and to this solution is added 10 parts of meta-cresol and 2.3 parts of concentrated sulfuric acid and the mixture is heated with stirring for 48 hours at 120° C.

B. One hundred parts of milled neoprene is dissolved in 100 parts of xylene and to this solution is added 2.25 parts of concentrated sulfuric acid, 1 part of boric acid, and 15 parts of meta-cresol and the mixture is heated with stirring for 10 hours at 110° to 120° C.

A series of adhesive compositions, comprising blends of the cyclized rubbers prepared as described above with the aldehyde resols listed below, is prepared and evaluated in the bonding of natural rubber, GRS, and neoprene to nylon and rayon. The results are shown in Table III.

TABLE II

Lamination of natural rubber to rayon

| Rubber Compound | Parts | Thermosetting Resol | Parts | Catalyst | Parts | Loading on Fabric, per | Bond Strength lbs./in. at— | |
|---|---|---|---|---|---|---|---|---|
| | | | | | | | 25° C. | 100° C. |
| Rubber | | | | None | | 10 | 2.0 | 1.5 |
| None | | Resorcinol/formaldehyde | 10 | NaOH | 0.05 | 15 | 4.5 | 4.0 |
| Cyclized Rubber | | | | | | 15 | 25.0 | 1.2 |
| Do | 20 | Resorcinol/formaldehyde | 10 | Hexa [1] | 1.0 | 10 | 39 | 31 |

[1] Hexamethylenetetramine.

From the data in Tables I and II, it is apparent that the adhesives, containing cyclized rubber and a thermosetting formaldehyde-mononuclear polyhydric phenol resol, are unexpectedly better in bond strength than either cyclized rubber alone or the thermosetting aldehyde resols alone. This is particularly true at elevated temperatures for the cyclized rubber, which yields a (1) To 30 parts of the solution in xylene of cyclized rubber (A) is added 3 parts of a 50% solution of a resorcinol-formadlehyde resol in normal butanol, prepared as described in Example I, and 1.5 parts of a 10% solution of hexamethylenetetramine in chloroform.

(2) To 30 parts of the solution in xylene of cyclized rubber (A) is added 6 parts of a 25% solution of a resorcinol-formaldehyde resol, prepared by dissolving 40 parts of paraformaldehyde in 270 parts of normal-butanol containing 0.4 part of potassium hydroxide, adding 50 parts of resorcinol, and allowing the mixture to stand at 25° C. for 24 hours, and 3 parts of a 10% solution of hexamethylenetetramine.

3. To 24 parts of a 10% solution in xylene of cyclized rubber (B) is added 0.1 part of magnesium oxide, 5 parts of a 25% solution of a resorcinol-formaldehyde resol in normal butanol, prepared as in Example I, and 1.25 parts of a 10% solution of hexamethylenetetramine in chloroform.

pending upon the use to which the composition is to be put. Generally, the preferred compositions for use as adhesives contain from 25 to 90% of the cyclized rubber by weight, based on total solids, and the thermosetting resol is the reaction product of formaldehyde with a mononuclear polyhydric phenol, especially the reaction product of formaldehyde with either resorcinol, pyrogallol, or phloroglucinol. Percentages outside this range, as from 5 to 95%, can be used, however, especially in applications where exceptionally high bond strengths are not critical.

In the lamination of nylon and rayon to natural and synthetic rubbers, best results are obtained

TABLE III

*Rubber-fabric lamination bonded with thermo-setting resol/cyclized rubber compositions*

| Fabric | Adhesive Composition | | | | | | Rubber Stock | Loading on Fabric, per cent by Weight | Bond Strength lbs./in. at— | |
|---|---|---|---|---|---|---|---|---|---|---|
| | Cyclized Rubber | Parts | Thermosetting Resol | Parts | Catalyst | Parts | | | 25° C. | 100° C. |
| Rayon | Cyclized GR-S [1] | | None | | | | Rubber | 15 | 6.5 | 1.0 |
| | | | | | | | GR-S [1] | 15 | 9.0 | 1.0 |
| | | | | | | | Neoprene | 15 | 4.0 | 1.0 |
| | | 20 | Resorcinol/formaldehyde | 10 | Hexa [2] | 1.0 | Rubber | 16 | 30 | 20 |
| | | | | | | | GR-S [1] | 17 | 36 | 30 |
| | | | | | | | Neoprene | 18 | 31 | 17 |
| Nylon | do | | None | | | | Rubber | 15 | 7.0 | 1.5 |
| | | | | | | | GR-S [1] | | 9.3 | 1.8 |
| | | 20 | Resorcinol/formaldehyde | 10 | Hexa [2] | 2.0 | Rubber | 10 | 27 | 18 |
| | | | | | | | GR-S [1] | 20 | 72 | 28 |
| Rayon | Cyclized Neoprene | | None | | | | Rubber | 10 | 8.0 | 2.0 |
| | | | | | | | GR-S [1] | 12 | 10.0 | 3.1 |
| | | 20 | Resorcinol/formaldehyde | 10 | Hexa [2] | 1.0 | Rubber | 20 | 26 | 17 |
| | | | | | | | GR-S [1] | 30 | 33 | 16 |

[1] A 75/25 butadiene/styrene interpolymer, prepared by procedures analogous to those of U. S. Patent 1,938,731.
[2] Hexamethylenetetramine.

EXAMPLE IV

Following the procedure described in U. S. Patent 1,668,236, there is added to 100 parts of rubber on a mill 2.5 parts of concentrated sulfuric acid mixed with 2.5 parts of a carbon black, sold under the trade name of "Micronex" and the mixture worked on the mill until the carbon black is homogeneously dispersed in the rubber. The blend is removed from the mill and heated in an oven for 20 hours at 130° C. The resulting product is somewhat tacky and resembles very lightly vulcanized rubber. The cyclized rubber thus obtained is cut into small pieces and dissolved in xylene to form a solution containing 15% solids by weight.

A resorcinol-formaldehyde resol is prepared by dissolving 24 parts of paraformaldehyde in 162 parts of n-butanol at about 90° C., cooling, and then adding to this solution with stirring at 20° C. 30 parts of resorcinol.

Forty-two parts of the cyclized rubber solution, prepared as described above, is mixed with stirring with 13.5 parts of the resorcinol-formaldehyde resol solution prepared as described above. To this mixture is added, with stirring, 7 parts of a 10% solution of hexamethylene-tetramine in chloroform, and the resulting blend used as an adhesive in laminating nylon to natural rubber according to the procedure described in Example I. The nylon fabric containing approximately 14% adhesive is found to exhibit an adhesion at 25° C. of 29 lbs./in. to the rubber carcass stock.

In the preparation of the compositions of this invention, the ratio of cyclized rubber to thermosetting formaldehyde-mononuclear polyhydric phenol resol can be varied over a wide range, depending with blends of cyclized rubber and formaldehyde-mononuclear polyhydric phenol resols varying in composition from about 60/40 to 80/20 and these compositions, therefore, constitute a preferred embodiment of this invention.

Cyclized rubbers may be prepared in any one of several ways, and their composition and properties may vary somewhat, but, however prepared, they are thermoplastic and have less chemical unsaturation than natural rubber. They appear to have an empirical formula of $(C_5H_8)_x$ and to be condensation derivatives of rubber. The term condensation is used in the same sense that it is employed by Cohen (page 245) of his "Organic Chemistry for Advanced Students," 1909 edition) namely:

"Condensation may, then, be defined as the union of two or more organic molecules or parts of the same molecule with or without the elimination of component elements, in which the new combination is effected between carbon atoms."

In the condensation, various reagents may be employed for converting rubber into the cyclized rubber. In one mode of preparation, a solution (the reaction with the rubber is advantageously carried out in solution) of the rubber in benzene or xylene is boiled for an hour or two and then, while continuing the boiling under a reflux condenser, up to 10% (based on the amount of rubber) of a conversion agent such as stannic chloride, is added. The heating is then continued for perhaps several hours, or until the desired reaction has taken place. The condensation derivative of the rubber is isolated by pouring the reaction mass into water, acetone, alcohol (methyl, ethyl, etc.) and the like.

Tin tetrachloride apparently reacts with the rubber to form a tin chloride addition product of rubber (or cyclized rubber) which probably has the formula $(C_5H_8)_xSnCl_4$. The tin and chlorine split off upon drowning the reaction product, leaving the cyclized rubber hydrocarbon. In this procedure aluminum chloride, ferric chloride, chromic chloride or another halide of an amphoteric metal, may replace the tin chloride.

The deformation point (point at which plastic flow is detectable) in any one case depends upon the type of rubber treated, the amount and type of catalyst, and the time and temperature used in the conversion. By varying these factors products varying in deformation point from 30° to 105° C. can be obtained. Products in the lower deformation range are ordinarily used in the practice of this invention.

The cyclized rubber called "Pliolite," is a thermoplastic rubber derivative made by condensing rubber with a catalyst of the tin chloride type. Specific details of its preparation, structure, etc., are set forth in Rubber Age for April, 1939.

The cyclized rubbers, made by treating a natural rubber or a synthetic rubber in solution with sulfuric acid and a phenol as described in the examples, constitute the preferred products for use in the practice of this invention. Other useful products are made by the procedure described in U. S. Patents 1,605,180; 1,668,235; 1,668,236; 1,668,237; 1,745,926; 1,782,140; 1,747,188; 1,846,-247; 1,852,294; 1,852,295; 1,852,345; 1,852,346; 1,853,334; 2,050,209 and 2,052,931. Of these products, the preferred cyclized rubbers are those which are resilient and elastic like soft vulcanized rubber. These products are in general obtained by reacting two or three parts of concentrated sulfuric acid or two to five parts of a phenol sulfonic acid with the rubber.

The examples have illustrated the use of natural rubber and such synthetic rubbers as GRS and neoprene in the preparation of cyclized rubbers. In place of these materials, such naturally occurring products as gutta-percha and balatta as well as such rubber-like materials as the polymers of butadienes with other polymerizable organic compounds containing olefinic unsaturation can be used, exemplified by the polymer obtained by polymerizing 2-chlorobutadiene-1,3 with 2-methyl butadiene-1,3, or butadiene-1,3 with acrylonitrile, etc.

In place of formaldehyde there can be used other aldehydes, and materials which under the conditions of reaction liberate formaldehyde, in the preparation of the thermosetting aldehyde resols. Examples of such materials are paraformaldehyde, hexamethylenetetramine, 1,3,5-trioxane, acetaldehyde, butyraldehyde, chloral, furfural, benzaldehyde and the like.

The thermosetting resols can be made from various mononuclear polyhydric phenols such as hydroquinone, catechol, pyrogallol, phloroglucinol, orcinol, and the like. The polyhydric phenols and particularly the dihydric mononuclear phenols are preferred because thermosetting aldehyde resols made therewith yield, with cyclized rubber, adhesives showing particularly good bond strengths at elevated temperatures.

To the compositions of this invention can be added, if desired, any of the usual ingredients usually used in compounding rubber, e. g., pigments, fillers, vulcanizing ingredients and antioxidants.

The compositions of this invention find particular utility in the lamination of rayon, cotton, and nylon to natural and synthetic rubbers in the fabrication of reenforced belting, tire carcasses and the like. In place of the enumerated textile materials, there can be used textiles based on organic cellulose derivatives, e. g., cellulose acetate, etc., polymers of vinyl and vinylidene compounds, silk, wool, casein and the like. In instances where the textile material will not withstand the temperature necessary for vulcanization of the rubber, a rubber stock is used which is susceptible of being vulcanized at the ordinary or moderately elevated temperatures, and the thermosetting formaldehyde-mononuclear polyhydric phenol resol is catalyzed so that it will convert under the same conditions as those used in vulcanizing the rubber. A particularly useful application is in the manufacture of composite articles made by laminating natural or synthetic rubber to a material in the form of a film, e. g., nylon and cellulose derivatives, etc.

The utility of the compositions of this invention as adhesives is not restricted to laminations involving the bonding of textile to natural and synthetic rubbers but they can also be used to advantage in laminating metals, e. g., steel, tin, aluminum, and the like to natural and synthetic rubber, to wood, textiles, etc., wood to wood, wood to metals, metal to metal, metal to textile, etc.

Some of the compositions embraced within the scope of this invention, particularly those containing from 40 to 90%, based on total solids, of the thermosetting formaldehyde-mononuclear polyhydric phenol resol are useful as molding and coating compositions.

I claim:

1. A composition for bonding textile materials to rubbery polymers comprising a blend of a cyclized rubber, obtained by heating a solution of a member of the group consisting of natural rubber, rubbery polymers of 2-chlorobutadiene-1,3 and rubbery polymers of butadiene-1,3 with a small proportion of sulfuric acid and a small proportion of a phenol, and a heat-convertible resol which is the reaction product of formaldehyde and resorcinol only, the cyclized rubber constituting from 25% to 90% by weight of the total solids of the composition.

2. A composition for bonding textile materials to rubbery polymers comprising a blend of a cyclized rubber, obtained by heating a solution of natural rubber with a small proportion of sulfuric acid and a small proportion of a phenol, and a heat-convertible resol which is the reaction product of formaldehyde and resorcinol only, the cyclized rubber constituting from 25% to 90% by weight of the total solids of the composition.

3. A composition for bonding textile materials to rubbery polymers comprising a blend of a cyclized rubber, obtained by heating a solution of a rubbery polymer of 2-chlorobutadiene-1,3 with a small proportion of sulfuric acid and a small proportion of a phenol, and a heat-convertible resol which is the reaction product of formaldehyde and resorcinol only, the cyclized rubber constituting from 25% to 90% by weight of the total solids of the composition.

4. A composition for bonding textile materials to rubbery polymers comprising a blend of a cyclized rubber, obtained by heating a solution of a rubbery polymer of butadiene-1,3 with a small proportion of sulfuric acid and a small proportion of a phenol, and a heat-convertible resol which is the reaction product of formaldehyde and resorcinol only, the cyclized rubber constituting from 25% to 90% by weight of the total solids of the composition.

HERMAN E. SCHROEDER.

REFERENCES CITED

The following references are of record in the file of this patent:

UNITED STATES PATENTS

| Number | Name | Date |
|---|---|---|
| 2,128,229 | Church | Aug. 30, 1938 |
| 2,291,208 | Brown et al. | July 28, 1942 |
| 2,300,367 | Harmon | Oct. 27, 1942 |
| 2,301,959 | Lanning | Nov. 17, 1942 |
| 2,328,534 | Carson | Aug. 31, 1943 |
| 1,970,835 | Benner | Aug. 21, 1934 |
| 2,343,551 | Harkins | Mar. 7, 1944 |
| 2,300,368 | Harmon | Oct. 27, 1942 |
| 2,072,508 | Mahlman et al. | Mar. 2, 1937 |

OTHER REFERENCES

"Chem. and Eng. News," Biggs et al., June 25, 1943, pages 962, 963.

Certificate of Correction

Patent No. 2,425,348.          August 12, 1947.

HERMAN E. SCHROEDER

It is hereby certified that error appears in the printed specification of the above numbered patent requiring correction as follows: Column 4, Table II, in the heading to the seventh column thereof, for "Loading on Fabric, per" read *Loading on Fabric, per cent by Weight*; and that the said Letters Patent should be read with this correction therein that the same may conform to the record of the case in the Patent Office.

Signed and sealed this 30th day of September, A. D. 1947.

[SEAL]

THOMAS F. MURPHY,
*Assistant Commissioner of Patents.* ing from 25% to 90% by weight of the total solids of the composition.

HERMAN E. SCHROEDER.

REFERENCES CITED

The following references are of record in the file of this patent:

UNITED STATES PATENTS

| Number | Name | Date |
|---|---|---|
| 2,128,229 | Church | Aug. 30, 1938 |
| 2,291,208 | Brown et al. | July 28, 1942 |
| 2,300,367 | Harmon | Oct. 27, 1942 |
| 2,301,959 | Lanning | Nov. 17, 1942 |
| 2,328,534 | Carson | Aug. 31, 1943 |
| 1,970,835 | Benner | Aug. 21, 1934 |
| 2,343,551 | Harkins | Mar. 7, 1944 |
| 2,300,368 | Harmon | Oct. 27, 1942 |
| 2,072,508 | Mahlman et al. | Mar. 2, 1937 |

OTHER REFERENCES

"Chem. and Eng. News," Biggs et al., June 25, 1943, pages 962, 963.

Certificate of Correction

Patent No. 2,425,348. August 12, 1947.

HERMAN E. SCHROEDER

It is hereby certified that error appears in the printed specification of the above numbered patent requiring correction as follows: Column 4, Table II, in the heading to the seventh column thereof, for "Loading on Fabric, per" read *Loading on Fabric, per cent by Weight*; and that the said Letters Patent should be read with this correction therein that the same may conform to the record of the case in the Patent Office.

Signed and sealed this 30th day of September, A. D. 1947.

[SEAL]

THOMAS F. MURPHY,
*Assistant Commissioner of Patents.*